United States Patent
Shao et al.

(10) Patent No.: US 7,310,350 B1
(45) Date of Patent: Dec. 18, 2007

(54) MOBILE SURVEYS AND POLLING

(75) Inventors: Victor Shao, Redwood City, CA (US);
Michael McGee, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 594 days.

(21) Appl. No.: 09/751,259

(22) Filed: Dec. 29, 2000

(51) Int. Cl.
*H04L 12/56* (2006.01)
*G06F 17/30* (2006.01)

(52) U.S. Cl. .................. 370/466; 370/401; 370/338; 705/10; 455/2.01

(58) Field of Classification Search ........... 370/338, 370/352, 401, 466, 259, 260; 709/200–206, 709/227, 228; 705/1, 10, 710; 455/2.01
See application file for complete search history.

(56) References Cited

U.S. PATENT DOCUMENTS

| | | | |
|---|---|---|---|
| 5,564,070 A * | 10/1996 | Want et al. ............... | 455/507 |
| 5,715,399 A | 2/1998 | Bezos | |
| 5,960,411 A | 9/1999 | Hartman et al. | |
| 6,125,352 A | 9/2000 | Franklin et al. | |
| 6,189,029 B1 * | 2/2001 | Fuerst ........................ | 709/217 |
| 6,192,380 B1 | 2/2001 | Light et al. | |
| 6,199,079 B1 | 3/2001 | Gupta et al. | |
| 6,304,898 B1 * | 10/2001 | Shiigi ........................ | 709/206 |
| 6,324,266 B1 * | 11/2001 | Mannings ................. | 379/92.04 |
| 6,341,353 B1 | 1/2002 | Herman et al. | |
| 6,378,075 B1 | 4/2002 | Goldstein et al. | |
| 6,421,693 B1 | 7/2002 | Nishiyama et al. | |
| 6,457,045 B1 * | 9/2002 | Hanson et al. ............. | 709/206 |
| 6,477,504 B1 * | 11/2002 | Hamlin et al. ............. | 705/10 |
| 6,535,885 B1 * | 3/2003 | Nardone et al. ............ | 707/101 |

(Continued)

FOREIGN PATENT DOCUMENTS

WO      WO 00/03554 A1      1/2000

(Continued)

OTHER PUBLICATIONS

Yahoo!; What is Yahoo! Wallet?; Oct. 18, 2000; retreived from the Internet Archives (http://www.archive.org) at http://web.archive.org/web/20001018070000/help/wallet/wallet-07.html.

(Continued)

*Primary Examiner*—Chi Pham
*Assistant Examiner*—Ahmed Elallam
(74) *Attorney, Agent, or Firm*—Hickman Palermo Truong & Becker LLP

(57) ABSTRACT

A method and system are provided for allowing mobile device users to participate in an online survey community by entering opinions and reading opinions of other through their mobile devices. The mobile devices need not support the same protocol as the server that manages and provides the survey information. In particular, a system is provided in which users of WAP-enabled mobile phones can enter opinion information into their WAP phones immediately after an event that is the subject of a survey, even though a Web server that uses a protocol not supported by the phones manages the survey data. Further, a feature is provided to defer the transmission of the opinion data from the phone, thereby allowing the opinion data to be batched, or to be entered even when the phone network is not available.

12 Claims, 2 Drawing Sheets

U.S. PATENT DOCUMENTS

| | | | |
|---|---|---|---|
| 6,556,974 B1 * | 4/2003 | D'Alessandro | 705/10 |
| 6,578,037 B1 | 6/2003 | Wing et al. | |
| 6,601,761 B1 | 8/2003 | Katis | |
| 6,615,131 B1 * | 9/2003 | Rennard et al. | 701/200 |
| 6,618,746 B2 * | 9/2003 | Desai et al. | 709/204 |
| 6,631,371 B1 | 10/2003 | Lei et al. | |
| 6,651,217 B1 | 11/2003 | Kennedy et al. | |
| 6,668,167 B2 * | 12/2003 | McDowell et al. | 455/433 |
| 6,701,366 B1 * | 3/2004 | Kallas et al. | 709/227 |
| 6,748,449 B1 | 6/2004 | Dutta | 709/245 |
| 6,754,635 B1 * | 6/2004 | Hamlin et al. | 705/10 |
| 6,807,532 B1 * | 10/2004 | Kolls | 705/10 |
| 6,826,540 B1 * | 11/2004 | Plantec et al. | 705/10 |
| 6,986,060 B1 | 1/2006 | Wong | |
| 2001/0011250 A1 | 8/2001 | Paltenghe et al. | |
| 2001/0011274 A1 | 8/2001 | Klug et al. | |
| 2001/0025245 A1 | 9/2001 | Flickinger et al. | |
| 2001/0027439 A1 | 10/2001 | Holtzman et al. | |
| 2001/0047292 A1 * | 11/2001 | Montoya | 705/10 |
| 2001/0052122 A1 * | 12/2001 | Nanos et al. | 725/9 |
| 2002/0002482 A1 * | 1/2002 | Thomas | 705/10 |
| 2002/0004783 A1 | 1/2002 | Paltenghe et al. | |
| 2002/0007303 A1 * | 1/2002 | Brookler et al. | 705/10 |
| 2002/0052774 A1 * | 5/2002 | Parker et al. | 705/10 |
| 2002/0059218 A1 * | 5/2002 | August et al. | 707/5 |
| 2002/0065774 A1 | 5/2002 | Young et al. | |
| 2002/0073166 A1 * | 6/2002 | Lynch | 709/217 |
| 2002/0095405 A1 | 7/2002 | Fujiwara | |
| 2002/0107726 A1 * | 8/2002 | Torrance et al. | 705/12 |
| 2004/0024656 A1 * | 2/2004 | Coleman | 705/27 |
| 2004/0043770 A1 * | 3/2004 | Amit et al. | 455/450 |
| 2004/0093257 A1 * | 5/2004 | Rogers et al. | 705/10 |
| 2004/0139043 A1 | 7/2004 | Lei et al. | |
| 2004/0193479 A1 * | 9/2004 | Hamlin et al. | 705/10 |
| 2005/0071219 A1 * | 3/2005 | Kahlert et al. | 705/10 |

FOREIGN PATENT DOCUMENTS

| | | |
|---|---|---|
| WO | WO 01/10080 A2 | 2/2001 |
| WO | WO 01/43390 A2 | 6/2001 |

OTHER PUBLICATIONS

Just Deals.com; Order Confirmation; Retreived from http://weinbeck.mit.edu/keyboard.pdf.

Boutlon, Clint; Yahoo! Moves to Speed Checkout; Oct. 5, 1999; http://www.internetnews.com/ec-news/article.php/212081.

Crouch, Cameron; Yahoo Shopping Goes Express; Oct. 6, 1999; PC World.

Barnett, Megan; 1999: Year of the E-Wallet; Jun. 30, 1999; PC World.

Yahoo Media Relations; Yahoo! Makes Online Shopping Easier for Consumers; Oct. 5, 1999; Yahoo Press Release.

Yahoo Media Relations; Yahoo! Shopping Now Available on Web-Enabled Phones; Nov. 22, 2000; Yahoo Press Release.

Patterson et al; Computer Organization & Design; The Hardware/Software Interface: 1999; Morgan Kaufmann Publishers, Inc; Second Edition; pp. 575-576.

Christer Erlandson, et al., "WAP—The wireless application protocol," Ericsson Review No. 4, 1998, XP-000792053, pp. 150-153.

State Intellectual Property Office of P.R.C., "Notification of the First Office Action," Application No. 02814466.X, dated Jul. 22, 2005, 4 pages.

Current Claims, Application No. 02814466.X, Claims 1-24, 4 pages.

* cited by examiner

MOBILE SURVEYS AND POLLING

FIELD OF THE INVENTION

The present invention relates to providing services to clients and, more specifically, to providing mobile clients with services for participating in online communities through surveys and polls.

BACKGROUND OF THE INVENTION

People frequently make decisions based on the recommendations of others. For example, many people will not go to a movie if their favorite movie critic gives the movie a negative review. With the advent of the Internet, people are relying less on the opinions of "expert" critics and more on the opinions of "communities", as expressed by the individual and cumulative survey results at the many survey and polling sites on the Internet.

The best time to capture survey or polling data is immediately following the event that is the topic of the survey or poll. Unfortunately, movie reviews and restaurant reviews typically do not take place until hours after the user has eaten or seen the movie. This is due to the fact that the user typically must return home from an event, connect a computer to the Internet, and then navigate to the appropriate polling site before the user can take a survey about the event. By that time the user might have forgotten some of the details, or might not bother filling out a survey at all.

Based on the foregoing, it is clearly desirable to provide techniques for capturing polling and survey data in a manner that is both convenient and immediate.

SUMMARY OF THE INVENTION

A method and system are provided for allowing mobile device users to participate in an online survey community by entering opinions and reading opinions of other mobile device users through their mobile devices. The mobile devices need not support the same protocol as the server that manages and provides the survey information.

In particular, a system is provided in which users of WAP-enabled mobile phones can enter opinion information into their WAP phones immediately after an event that is the subject of a survey, even though a Web server that uses a protocol not supported by the phones manages the survey data. Further, a feature is provided to defer the transmission of the opinion data from the phone, thereby allowing the opinion data to be batched, or to be entered even when the phone network is not available.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and system are provided for allowing users of mobile devices to participate in online communities through polls and surveys. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

The techniques described herein, for establishing an online community of mobile survey participants, take advantage of technology that expands Internet access to devices other than conventional computer systems. For example, the survey participants may connect to the online community using the system described in U.S. patent application Ser. No. 09/454,515, entitled "Providing Clients with Services that Retrieve Data from Data Sources That Do Not Necessarily Support the Format Required by the Clients", filed by Magnus M. Lonnroth et al on Dec. 6, 1999 (hereafter "Lonnroth"), the contents of which are incorporated herein by reference.

Figure 1:
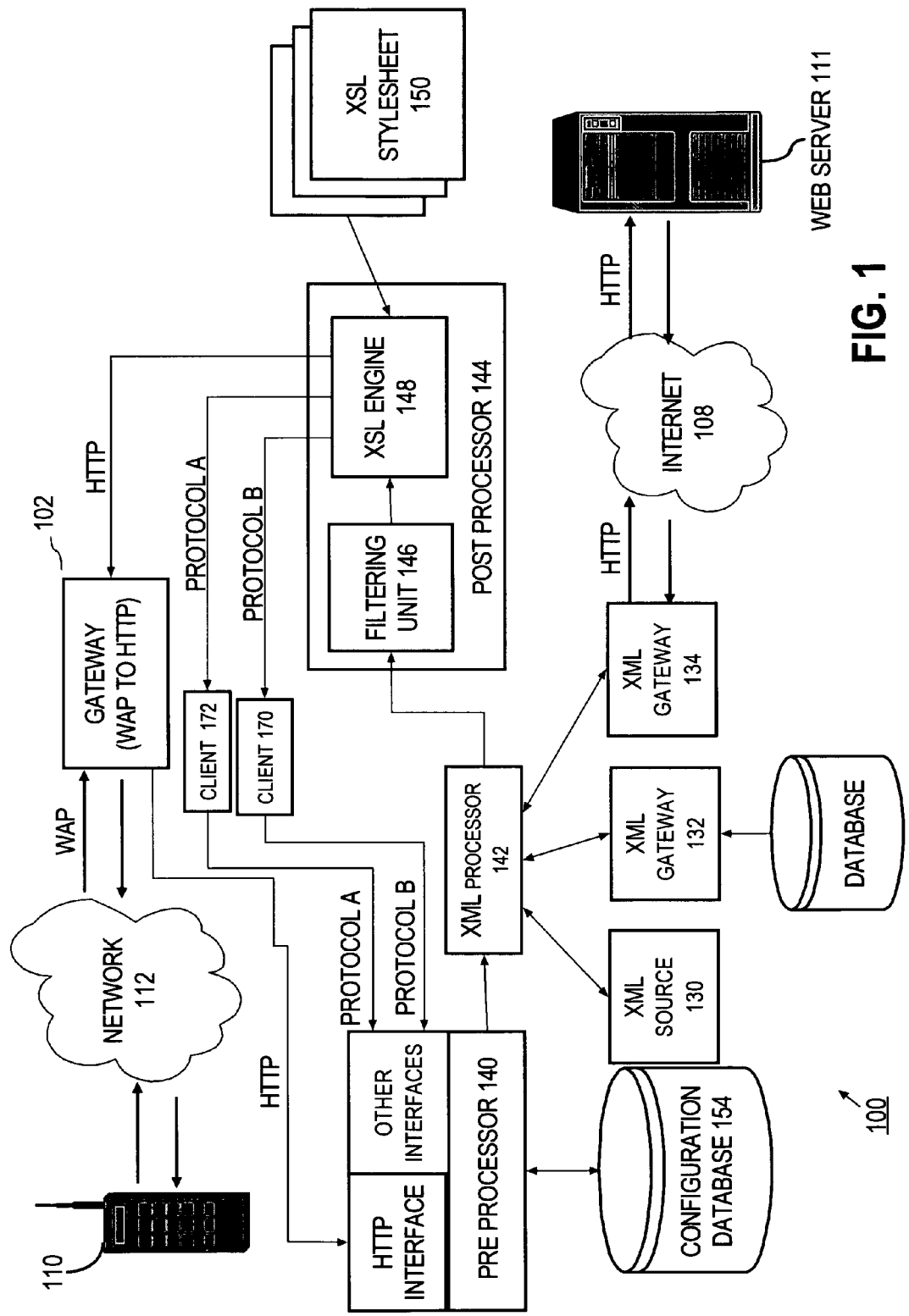
FIG. 1 is a block diagram of a system configured according to an embodiment of the invention.

FIG. 1 is a block diagram that illustrates a system 100 that implements an embodiment of the Lonnroth invention. System 100 includes a mobile device (phone 110) that communicates with a gateway 102 over a network 112. According to one embodiment, phone 110 is a WAP phone that is configured to support the display of WML pages. In such an embodiment, gateway 102 could, for example, be a WAP gateway configured to communicate with phone 110 by sending WML pages through network 104 using the WAP protocol.

System 100 further includes a pre-processor 140, an XML processor 142, and a post processor 144. In general, pre-processor 140 receives requests and from clients and generates request objects based thereon. In one embodiment, those request objects take the form of XML documents. Those XML document "requests" are forwarded to XML processor 142 which obtains XML documents from one or more XML sources to which XML processor 142 is connected. As shall be described in greater detail hereafter, those XML sources may include one or more gateways connected to non-XML sources. According to one embodiment of the invention, those non-XML sources include a web server 111 that serves as the repository for opinion data submitted by a community of mobile device users.

The XML documents that are created in response to the requests are passed to post processor 144 to be filtered and formatted according to the needs of the requesting entity. The conversion operation performed by post processor 144 is driven by XSL style sheets 150. Documents produced by post processor 144 are then delivered to the requesting entity.

Mobile Polling and Survey Communities

According to one embodiment of the invention, system 200 is used to implement a polling and survey online community of mobile device users. In particular, techniques are provided for:

1) capturing the survey/polls about an event immediately following the event, to get the most participants and the best data;

2) allowing users of mobile devices to see, in real time, the ratings and comments from other users and how their feedback compared with others; and 3) encouraging community-building experiences for mobile portals, with the users interacting with each other.

The present techniques are not limited to any particular type of "event" about which mobile device users can immediately register their opinions. For example, the event may be a type of event about which professional critics traditionally render opinions, such as seeing a movie or eating at a restaurant. However, the techniques may also be used with other types of events. For example, the event may be the casting of a political vote, where the survey taken with the mobile device constitutes an "exit poll". The event may also be reading a particular news article in a newspaper, or hearing a particular news report on television.

Just as the event that is the topic of the survey may vary, so may the types of questions asked about the event. For example, the survey associated with reading a news article may ask the user to rate the article for content or usefulness. On the other hand, the survey associated with an editorial opinion given in a television news report may ask users whether they agree with the opinion. Thus, while aspects of the invention shall be described with relation to an embodiment that implements an online community Movie Guide, the present is not limited to the specifics of such an embodiment.

Service Requests

Clients send requests to pre-processor 140. For example, mobile device 110 sends requests to gateway 102 through network 112 using the WAP protocol. Those requests are converted into HTTP requests that, as shall be explained hereafter, ultimately result in HTTP requests received by the web server 111 that is responsible for collecting and publishing the survey data of the online survey community.

The nature and format of the requests will vary based on the type of the client. Each service request identifies the service that is requested, and may include any number of parameter values associated with the request. The services specified in the service requests that pre-processor 140 receives from clients may vary widely in complexity. For example, one service may simply involve obtaining the results of a survey from web server 111. Yet another service may involve running searches against hundreds of Web sites, updating numerous databases based on the results of the searches, and transmitting email messages to hundreds of users to inform them that the database has been updated.

According to one embodiment, the services available to each user, including user-defined services, are defined in a configuration database 154 that is accessible to pre-processor 140.

The Pre-Processor

Pre-processor 140 is configured to receive and process requests from clients. The protocols supported by pre-processor 140 dictate the form in which the requests must be received, and will vary from implementation to implementation. The present invention is not limited to any particular type or number of protocols supported by pre-processor 140. In the illustrated embodiment, pre-processor 140 supports HTTP and as well as two other protocols (shown as protocol A and protocol B). Through its support for HTTP requests, pre-processor 140 appears as a web server to gateway 102, and is therefore able to receive HTTP requests that originated as WAP requests issued from WAP-enabled devices.

Upon receiving a service request, the pre-processor 140 performs any operations that are required prior to servicing the request. Such operations may include, for example, performing security checks to determine whether the client issuing the request is authorized to issue the request. According to one embodiment, information about which services are authorized for each client is stored in configuration database 154.

According to one embodiment, the pre-processor 140 also generates, based on the request and information contained in configuration database 154, a request object in the form of an XML document. Specifically, the pre-processor 140 searches configuration database 154 to determine how to construct the XML document. The search may be performed, for example, based on the phone number and user id associated with the service request. The information contained in configuration database for that phone number/user-id combination may specify, for example, links to the information sources that correspond to the requested service, user preferences, etc. The XML document generated by pre-processor 140 in response to a service request is referred to herein as a XML request document. The XML request document includes links that identify the information sources that correspond to the requested service. As shall be described in greater detail hereafter, the XML document may also include metadata, inserted by the pre-processor 140, that is used by the various components of post processor 144.

For the purpose of illustration, it shall be assumed that (1) pre-processor 140 receives a request for survey information, (2) the request originated from phone 110, and (3) phone 110 is a WAP phone. Upon verifying that phone 110 is authorized to make the request, pre-processor 140 generates an XML request document. In the present example, the resulting XML request document may include, for example, a link to the web site associated with the online survey community. The XML request document thus created is then passed to the XML processor 142.

The XML Processor

Upon receiving an XML request document from XML preprocessor 140, XML processor 142 parses the XML request document. When the XML processor 142 encounters unresolved links within the XML request document, XML processor 142 resolves the links, typically by making calls through one or more XML gateways.

XML gateways are mechanisms for converting between XML and messages produced by other types of data sources. For example, one XML gateway may be for the World Wide Web, and therefore convert between XML and HTML messages. Another XML gateway may be for a database system, and therefore convert between XML and the protocol supported by the database system. Yet another XML gateway may be for a mainframe computer, and convert between XML and the message protocol supported by the mainframe computer. The illustrated system 100 includes two XML gateways 132 and 134. XML gateway 132 is configured to convert between XML and a protocol used by a database system. XML gateway 134 is configured to convert between XML and HTTP messages on the World Wide Web.

The XML gateways that are called by XML processor 142 in response to a particular XML request document are the XML gateways that are connected to the data sources that have the information identified in the XML request document. For example, assume that the survey community web server 111 is available over the World Wide Web. In response to an XML request document to obtain survey information, XML processor 142 makes calls to gateway 134. Gateway 134 converts those requests into HTTP messages that request the required information from the appropriate site on the World Wide Web. In response to the HTTP requests, the information is supplied from those Web sites back to the XML gateway 134 in the form of one or more HTML documents. Gateway 134 converts the HTML documents to XML documents and supplies the XML documents to XML processor 142. XML documents that are supplied to XML processor 142 in response to XML requests are referred to herein as XML response documents. XML processor 142 forwards XML response documents to post processor 144.

According to one embodiment, for each XML request, the XML processor 142 creates a single "composite" XML response document by replacing links in the XML request with the XML response documents received from the entities that correspond to the links. For example, assume that the XML request document initially included one link to the web page managed by web server 111 that contains survey information for a particular movie and one link to the "home page" of that particular movie. In response to receiving the XML request document, XML processor 142 would resolve each of the links in the XML request document by sending requests to those web sites through XML gateway 134. Those web sites respond to the requests using HTTP responses that are converted by gateway 134 into XML response documents.

The XML request is then transformed by the XML processor 142 into a composite XML response document based on the information received back from those web sites. Specifically, the information received from the movie survey site is converted to XML by XML gateway 134 and passed to XML processor 142. XML processor 142 then replaces the link to the movie survey site in the XML request document with the information (now in XML format) received from the movie survey site. Similarly, the information received from the movie home page is converted to XML by XML gateway 134 and passed to XML processor 142. XML processor 142 then replaces the link to the movie home page in the XML request document with the information (now in XML format) received from the FedEx package tracking Web site. The XML request document is transformed into a composite XML response document by virtue of these replacements. The composite XML response document produced by this process is passed from the XML processor 142 to post processor 144.

In the movie example given above, the service involved obtaining information from multiple sources that support the same protocol (i.e. multiple web sites). However, XML processor 142 may be connected to any number of different gateways, and a single service may involve obtaining information from multiple devices through multiple gateways. For example, a particular service may involve resolving one link by obtaining information from a web site through gateway 134, and resolving a different link by obtaining information from a database through gateway 132. Both the information from the web site and the information from the database are converted into XML, which is used to replace the corresponding links within the XML request document. Consequently, the composite XML response document may include, in XML structure, information obtained from sources that support very different formats and protocols.

The Post-Processor

The post-processor 144 receives XML responses from the XML processor. According to one embodiment, post-processor 144 includes a filtering unit 146 and an XSL engine 148. In general, the filtering unit 146 selectively filters the XML response documents based on filtering rules, and the XSL engine 148 transforms the XML response documents, based on XSL stylesheets, to the format, layout, and document type desired for the client for which the response is destined. The operations of these components are described in greater detail hereafter.

The Filtering Unit

Filtering unit 146 receives the composite XML response documents from XML processor 142 and selectively removes content from those documents. For example, assume that a client issues a request for information on the World Wide Web about used cars for sale, and that the request is for a specific year, model and color of car. An XML request is generated by pre-processor 140 based on the request, and passed to XML processor 142. XML processor makes calls to an XML gateway connected to the World Wide Web and configured to translate between HTML and XML (e.g. XML gateway 134). The XML gateway issues HTTP requests to one or more Web sites that contain used car sales information. For the purpose of illustration, assume that the search engines at those Web sites are able to search based on year and model criteria, but although the Web sites are able to supply color information, the search engines do not support color as a search criteria.

The XML gateway 134 receives the responses back from the Web sites, typically in the form of HTML pages, and generates XML response documents that contain the content of those HTML pages. In the present example, the XML response documents would include information about all cars that satisfied the specified year and model criteria, regardless of their color. The XML response documents are incorporated into the XML request document to create the composite XML response which is received by filtering unit 146. Filtering unit 146 filters the composite XML response based on the color specified in the initial request. The resulting "filtered" XML response includes information on only those cars that satisfy the color, year and model criteria.

XSL Style Sheets

XSL style sheets contain instructions about how each type of data item that can be contained in an XML document should be formatted prior to transmission to the client. For example, an XSL style sheet may indicate that a particular type of data item (e.g. all "employee" fields) should be displayed in a particular font type, font size, and color, with left justification. The formatting and layout rules contained in an XSL style sheet may incorporate logic and conditional branches. For example, an XSL style sheet may specify that all "employee" fields are displayed in red if the employee age is over 50, in blue if between 10 and 50, and in green if under 10. The rules may take into account the context of data items as well. For example, an XSL rule may specify that employee information is displayed as a table if the employee information is part of a purchase order.

According to one embodiment, each type of client device is associated with a corresponding, static, XSL style sheet. The XSL style sheet associated with a device includes general instructions about how data should be formatted for the device. Alternatively, separate XSL style sheets may exist for each service for each device. Further, user's may be allowed to customize their services, resulting in separate XSL style sheets per user per service per device. Alternatively, XSL stylesheets may be generated on-the-fly, rather than statically. For example, an XSL stylesheet may be generated based on a service definition in response to the service thus defined being requested by a particular user using a particular type of client device.

According to one aspect of the invention, the commands contained in XSL style sheets 150 are expanded beyond formatting and layout instructions to include transformation rules that cause the XML document to be transformed into another type of document or message. For example, an XSL style sheet may contain instructions for transforming XML documents into HTML documents. Another XSL style sheet may contain instructions for transforming XML documents into WML documents. Yet another XSL style sheet may contain instructions for transforming XML documents into .pdf documents. The entity responsible for applying XSL style sheets to XML documents is the XSL engine 148, which shall now be described.

The XSL Engine

XSL engine 148 receives the filtered XML responses from the filtering unit 146, determines the XSL style sheets that apply to the XML document, and uses the information in the applicable style sheets to convert the XML document into the format required by the client to which the document is to be sent. The format of the resulting document will vary based on the XSL style sheets that are applied to the XML document by the XSL engine 148.

In the case that the information request originated with a WAP enabled device, the selected XSL style sheet causes the XML document to be converted into a WML document to be sent to according to the WAP protocol to the WAP device. The XSL stylesheets associated with other types of transformations would be used for other types of devices. For example, if the initial request came from a Web browser, then XSL engine 148 would apply an XSL stylesheet that transforms XML documents into HTML, and transform the composite XML response to an HTML document to be sent using HTTP to the requesting client.

Movie Guide

According to one embodiment, a Movie Guide feature is provided. The Movie Guide feature allows mobile users to rate a movie on their mobile devices by giving 1-5 stars as well as a short description. This promotes the building of a "community" of mobile-device-using film critics, who can write down their thoughts and share their opinion immediately following the viewing of a movie.

Not only will the reviews be relevant and fresh due to the fact that the opinions are captured immediately, but it is anticipated that the immediate availability of sending an opinion after an event will result in higher participation rates than are currently experienced through normal online survey channels, as people will want to "vent" a little after an especially good or bad movie. In particular, mobile users can immediately share their thoughts after viewing a film, in the form of stars ratings and short descriptions. Further, those thoughts are immediately available to all other members of that online community using the Movie Guide service. The other members of the online community are then able to view these thoughts on their mobile devices.

According to one embodiment, the members of the community can take the following actions:

1) Post a new rating/description. When posting, user agrees that their community user ID is attached to the post. Subsequently, other users can respond privately or publicly to the post;

2) Reply to an existing rating/description publicly and thereby starting a message thread; and 3) Reply to an existing rating/description privately via our Short Messaging service.

According to one embodiment, mechanisms are provided to promote particular users, if they become an authoritative voice on movies. For example, at the top of every movie description, the message displayed to the mobile device users that belong to the community may indicate, "MovieCritic from Community says, "This film is awesome!", where MovieCritic represents the identification of the user and Community represents the name of the online community.

According to one embodiment of the invention, a mobile device user sends a request over network 112 and through gateway 102. The request may, for example, be for information about a particular movie. The request ultimately results in the retrieval of movie information from web server 111, which is conveyed back to the mobile device. According to one embodiment, the movie information will be rendered on the mobile device along with selection options. For example, information about the movie "Gone in 60 Seconds" may appear as follows:

---
Gone in 60 Seconds (PG-13)
1) Read description
2) Find movie theater
3) See reviews
4) Post a review
OK    Cancel

---

Items 1, 2, 3 and 4 represent selectable options. According to one embodiment, if a user selects option 3 (i.e. "See Reviews"), a message is sent to gateway 102 using the WAP protocol, and eventually to web server 111 using the HTTP protocol. Web server 111 responds to the message by sending a message in HTTP protocol, which results in data being sent to the mobile device 110 causing the mobile device 110 to generate the following display:

---
Reviews for Gone in 60 Seconds (PG-13)
Average rating: ***
1) ***** This film rocks! (2)
2) * Very poor (0)
3) **OK (1)
4) *** good effects, but poor.. (2)
OK    Cancel

---

According to one embodiment, if a user selects option 4 (i.e. "* good effects, but poor."), a message is sent to gateway 102 using the WAP protocol, and eventually to web server 111 using the HTTP protocol. Web server 111 responds to the message by sending a message in HTTP protocol, which results in data being sent to the mobile device 110 causing the mobile device 110** to generate the following display:

```
Rating: ***
OracleMobile User: Jumbo
Good effects, but poor on
storyline.
1) Read threads
2) Respond publicly
3) Email user privately
OK          Cancel
```

If a user selects options 1 (i.e. "Read threads"), a message is sent to gateway 102 using the WAP protocol, and eventually to web server 111 using the HTTP protocol. According to one embodiment, the message includes data identifying the opinion that was being displayed when the option was selected (the "target opinion"). Web server 111 responds to the message by retrieving another opinion that is associated with the target opinion, and sending a message about the other opinion using the HTTP protocol. The message sent by the web server 111 results in data being sent to the mobile device 110 causing the mobile device 110 to display the other opinion.

If a user selects option 2 (i.e. "Respond publicly"), a message is sent to gateway 102 using the WAP protocol, and eventually to web server 111 using the HTTP protocol. According to one embodiment, the message includes data identifying the target current opinion. Web server 111 responds to the message by sending a message that causes options to be displayed on mobile device 110 that allow the user to enter a response opinion. After the user enters a response opinion, the user selects an option that causes a message to be sent to gateway 102 using the WAP protocol, and eventually to web server 111 using the HTTP protocol. According to one embodiment, the message includes data identifying the target opinion. The server 111 then saves the response opinion, along with data that indicates an association between the response opinion and the target opinion.

If a user selects option 2 (i.e. "Email user privately"), a message is sent to gateway 102 using the WAP protocol, and eventually to web server 111 using the HTTP protocol. According to one embodiment, the message includes data identifying the target opinion. Web server 111 responds to the message by sending a message that causes options to be displayed on mobile device 110 that allow the user to enter an email message. After the user enters an email message, the user selects an option that causes a message to be sent to gateway 102 using the WAP protocol, and eventually to web server 111 using the HTTP protocol. According to one embodiment, the message includes data identifying the target opinion. The server 111 then generates and transmits an email message that includes the response opinion to the user identified in the target opinion.

In the embodiments described above, opinion data is communicated to web server 111 in response to the opinion data being entered in the mobile device 110. However, according to an alternative embodiment, an "offline" mode is provided in which the opinion data is stored in the mobile device itself. The opinion data remains in the mobile device until the user performs some specified action. When the user performs the specified action, the mobile device "syncs" with the central database of web server 111 by transferring all locally stored opinions to the database. While deferring the transmission of opinions in this manner does delay the dissemination of the opinion to other members of the online community, the ability to defer may be beneficial for other reasons. For example, when the mobile device is out of range of network 112, the user can have the benefit of entering the opinion immediately after the event even without the availability of the network. Similarly, the transmission of the opinion may be deferred under circumstances where making individual calls for each opinion would be costly.

Movie Guide Features

According to one embodiment, the movie guide includes numerous features that shall be described hereafter. The features shall be described with reference to the user interface displayed on the mobile device, and user interaction with that user interface. It shall be understood, however, that the interface is generated on the mobile device in response to messages received from a server, and that selection of an option displayed at the mobile device causes one or more response messages to be sent back to the server.

According to an embodiment, the user is initially presented with the following main movie guide menu:

```
Movie Guide

Movie Guide
1 New Releases
2 Top 10 Sellers
3 Search by Title
4 Community Reviews
5 Browse by Type
6 Browse by Theater
7 <preset theater 1>
8 <preset theater 2>
etc.
OK          Main
```

In response to selecting option 4, community reviews, the user is presented with the following community reviews menu:

```
Community Reviews

Movie Reviews
1 Recent Reviews
2 July top 10
3 June top 10
4 May top 10
5 All top 10
OK          Cancel
```

In response to selecting option 1, recent reviews, the user is presented with a list of reviews that are ordered based on the time that the reviews were entered, with the most recent review displayed first. Rather than merely present the user with the rank of each review in the list (e.g. Review 5 of 75), the review listing presented to the user preferably also includes the title of the movie. The user may then browse through the review listings to identify the reviews for a movie in which the user is interested, and read those reviews. When the user is done reading reviews, the user may select a "Done" option and return to a previous menu.

In response to selecting any of options 2 through 5 of the community reviews menu, the user is presented with a list of the top movies for the designated month (or for all months, when "All" is selected). The listing may have the form:

| Month top 10/All top 10 |
| --- |
| 1 movie1<br>2 movie2<br>etc.<br>OK    Cancel |

If the user selects "OK", then the user is presented with a screen to read the reviews for the selected movie. The movies are ordered by rating for the specified time period, with the movie with the highest rating in slot 1, the movie with the second highest rating in slot 2, etc. According to one embodiment, the "All top 10" displays the ten movies with the highest average rating over the entire lifetime of the Movies Guide service.

Selecting New Releases option from the Movie Guide main menu results in the following screen:

| New Releases |
| --- |
| New Releases<br>1 movie1<br>2 move 2<br>etc.<br>OK    Cancel |

Selecting Cancel returns the user to the Movie Guide main menu. Selecting OK causes the Movie Match display to be presented for the currently selected movie. The Movie Match display shall be described in greater detail hereafter.

Selecting the Top 10 Sellers option from the Movie Guide main menu produces a menu that lists the top 10 selling movies, which may have the format:

| Top 10 Sellers |
| --- |
| Top 10 Sellers<br>1 movie 1<br>2 movie 2<br>etc.<br>OK    Cancel |

Selecting Cancel returns the user to the Movie Guide main menu. Selecting OK causes the Movie Match display to be presented for the currently selected movie.

Selecting the Search by Title option from the Movie Guide main menu produces a menu that allows the user to enter the name (or a part of a name) of a movie, which may have the format:

| Search by Title |
| --- |
| Enter title<br>(partial ok):<br>\|<br>OK    alpha<br>1 2 3 |

Selecting alpha designates that lowercase letters will be entered onto the phone when keypresses are made. Selecting OK causes a list of the movies with titles that match the entered name to be displayed. If only one movie matches the entered name, then the user may be taken directly to the Movie Match listing for that movie.

As mentioned above, various selection sequences can lead the user to the Movie Match listing. According to one embodiment, the Movie Match listing of a movie has the following format:

| 1 - Movie Match |
| --- |
| "movie" (pg-13)<br>4.5/5 210 ratings<br>1 Read summary<br>2 Find theater<br>3 Read reviews/or no line if no reviews<br>4 Submit review<br>5 Send to friend<br>OK    Cancel |

Movie Match may come from first movie search, or from the list of all movies in a theater. For the first movie found, Cancel should go back to the top of movie guide. For all movies, Cancel should go back to All Showtimes.

The following screen is an example of a screen presented when a movie search matches 18 or fewer movies:

| 2 - List Return for <= 18 movies |
| --- |
| Select movie:<br>1 movie1<br>2 movie2<br>etc.<br>OK    Cancel |

Selecting OK takes the user to the Movie Match screen for the selected movie. Selecting Cancel returns the user to the Movie Guide main menu.

The following screen is an example of a screen presented when a movie search matches more than 18 movies, or no movies:

| 3 - For > 18 movies/or Error (0 movies found) |
| --- |
| # Movies found, please refine<br>your movie title.<br>OK    Cancel |

Selecting OK takes the user back to the search screen. Selecting Cancel returns the user to the Movie Guide main menu.

The following screen is an example of what the user may see in response to selecting the Read Summary option from the Movie Match screen:

| Read Summary |
| --- |
| "movie"<br>blah blah blah<br>(Movie Summary)<br>blah blah blah<br>OK --> back to Movie Match |

The following screen is an example of what the user may see in response to selecting the Read Reviews option from the Movie Match screen:

| Read Reviews |
| --- |
| "movie"/Review X of X:<br>Bob<br>Rating 3/5<br>blah blah blah<br>More/Next    Option |

According to one embodiment, any public replies to a review are included on same stack as the review to which they are replying. For example, the stack of a review may appear as:

| |
| --- |
| Review 1 of 10:<br>Mick1<br>Rating 1/5<br>This movie sucked<br>--<br>Anonymous<br>bull crap, it rocked!<br>--<br>Jchone2000<br>bull on your bull, it did suck, Mick1 was right<br>Next    Option |

A user may respond to a review by selecting an option on a Read Reviews Options screen, which may have the following format:

| Read Reviews Options |
| --- |
| 1 Reply publicly<br>2 Reply to reviewer<br>3 Go to Movie Options<br>4 Top of Movie Guide<br>5 Main<br>OK    Cancel |

According to one embodiment, reviewers may specify whether they are willing to receive direct "non-public" replies to their reviews. If a reviewer has not selected the option to allow non-public replies, then the "reply to reviewer" option does not appear on the Read Reviews Options screen. Selecting the Cancel option returns the user to the Read Reviews screen.

When the Reply Publicly option is selected, the user may be presented with a screen for entering a reply as follows:

| Reply Publicly, p. 1 |
| --- |
| Enter reply:<br>\|<br>OK    alpha |

The Reply Publicly screen may have a second page that allows the user to specify how the user desires to be identified, and whether the user wants to allow private replies, as follows:

| Reply Publicly, P. 2 |
| --- |
| List me as:<br>1 Anonymous<br>2 ID - Public replies only<br>3 ID - Private replies allowed<br>OK    Cancel |

Selection of the Cancel option returns the user to the Read Review Options screen without submitting the reply. Selection of the OK option submits the reply. The Reply Publicly screen may have a third page that verifies that the reply has been processed, as follows:

| Reply Publicly, p. 3 |
| --- |
| Public reply added.<br>OK |

Selection of the OK option returns the user to the Read Reviews screen, with the reply that was submitted by the user added to the review.

Selection of the Reply Privately option brings up a screen as follows:

| Reply Privately, p. 1 |
| --- |
| Enter reply (your ID and address will be shown):<br>\|<br>Send    Cancel |

Selecting Cancel returns the user to the Read Review Options screen without submitting the reply. Selection of "Send" sends the reply to the reviewer to whom the user is replying, and generates the following screen:

| Reply Privately, p. 2 |
| --- |
| Private reply sent.<br>OK → go to Read Reviews |

Selecting the Submit Review option on the Movie Match screen brings up the following Submit Review screen:

| Submit Review 2.1 |
| --- |
| Rate and review "movie":<br>1 Submit<br>2 [ ] Rating<br>3 [ ] Review<br>4 [ ] Identity<br>5 Clear fields<br>6 Help<br>Help/Submit/Edit/Clear/Help    Cancel |

Selecting Cancel returns the user to the Movie Match main menu. The Submit Review 2.1 screen allows an implicit reviewing of a review, rating, and identity before submitting. In particular, the first three words of the review are displayed inside the brackets of the Review line. If the review and rating are blank, and the user selects the Submit option, the user is presented with a help page. If either the review or the rating is not blank but the identity is blank, then the user is presented with a Force Identity screen If either the review or the rating is not blank and an identity is specified, then the submit operation is successful and the user is returned to the Movie Match screen. A successful submit operation with a blank rating does not change the overall rating score of the movie. A successful submit operation with a blank review only affects the overall rating, and no review is entered.

The user may be presented with the following screen to select a rating:

---
Submit Review, 2.2
---
Select Rating:
1 *****
2 ****
3 ***
4 **
5 *
OK    alpha
---

The user may be presented with the following screen to enter a review:

---
Submit Review, 2.3
---
Review:
|
OK    alpha
---

The user may be presented with the following screen to enter an identity:

---
Submit Review, 2.4
---
List me as:
1 Anonymous
2 ID - Public replies only
3 ID - Private replies allowed
OK    Cancel → back to Submit Review 2.1
---

Selecting the Cancel button on the Submit Review 2.4 page returns the user to the Submit Review 2.1 page. If the user selects Help on the Submit Review 2.1 screen, or attempts to submit a review where both the rating and review are blank, the user is presented with the following screen:

---
Submit Review, 2.5
---
Help
You must enter a
rating and/or a
review before
submitting. The
identity allowing
private replies lets
other users respond
to the email address
you entered into
your OracleMobile
profile. Public
replies only respond
to the movie review ---
-continued
---
Submit Review, 2.5
---
thread.
OK
---

Selecting OK on the Submit Review 2.5 screen returns the user to the Submit Review 2.1 screen. The Force Identity screen mentioned above may be presented as follows:

---
Force Identity, 2.6
---
List me as:
1 Anonymous
2 ID - Public replies only
3 ID - Private replies allowed
OK    Cancel → go to Movie Match (no review entered)
---

Selecting the OK when an identity option is selected submits the review. Selecting Cancel returns the user to the Movie Match screen without submitting the review.

The following screens (Submit Review 1.1 to 1.4) illustrate an alternative embodiment to Submit Review screens 2.1 to 2.6.

---
Submit Review, 1.1
---
Rating (1-5):
|
OK    alpha
---

Entry of a value other than 1-5 causes this screen to be redisplayed until a value within the range 1 to 5 is entered and the OK option is selected.

---
Submit Review, 1.2
---
List me as:
1 Anonymous
2 ID - Public replies only
3 ID - Private replies allowed
OK    Cancel → go to Movie Match (cancel the Submit Review)
---

---
Submit Review, 1.3
---
Review (ok for none):
|
OK    alpha
---

- no entry only incorporates ratings into the rating calculation

---
Submit Review, 1.4
---
Your review:
Anonymous
Rating 4/5
blah blah blah
Submit    Cancel --> go to Movie Match (cancel the Submit Review)
---

| Submit Review, 1.4 |
|---|
| - OK goes back to Movie Match with updated settings (rating, # of ratings, include Read reviews line if first entry) |

Another option of the Movie Match screen is to send a review to a friend. Selecting the Send to Friend option results in display of the following screen:

| Send to Friend |
|---|
| Send Movie Description and Reviews To:<br>\|<br>OK    alpha |

The Send to Friend screen may list friends of the user about whom address information has been previously stored. The user may also add information to send to the friend using the following screen:

| |
|---|
| Enter Additional Message (ok for none):<br>\|<br>OK    alpha |

The user may be presented the option of reviewing and editing the message to be sent to the friend, using the following screen:

| |
|---|
| Review and Edit Message to "user":<br>blah blah blah\|<br>Send    alpha |

After the message is sent, the user can be presented with the following confirmation screen:

| |
|---|
| Movie Info and message sent to "user".<br>OK<br>- OK goes to Movie Match |

Another option on the Movie Guide main screen is Find Theater. Selecting the Find Theater option may bring up the following Find Theater screen:

| Find Theater |
|---|
| (location flow) |

The (location flow) represents previously stored location information that is selectable by the user. For example, the location flow may include entries for the work address and the home address of the user. Selecting the home address indicates that the user wants to locate a theater near the home of the user. The user may then be presented with a screen such as:

| Theater Listings based on location flow |
|---|
| "movie" playing at:<br>1  1.1 mi Theater1<br>2  2.0 mi Theater2<br>etc.<br>OK    Cancel --> go to Movie Match |

This screen indicates that a particular movie is playing at a theater that is 1.1 miles from the location selected by the user. When a user selects a theater from the theater listings, the user may be presented with a Showtimes screen as follows:

| Movie - Theater - Showtimes |
|---|
| "movie" "theater" Showtimes:<br>blah blah blah<br>Done    Option<br>- Done goes to Top of Movie Guide |

The user may also use the following Theater Option screen to perform various operations related to a theater.

| Theater Options |
|---|
| Theater Options<br>1 Save as preset<br>2 All movie showtimes<br>3 Search nearby businesses<br>4 Call theater<br>5 Driving directions<br>6 Call taxi<br>7 Top of Movie Guide<br>8 Main<br>OK    Cancel --> go to Movie - Theater - Showtimes<br>- search nearby goes to Travel Finders |

When the user picks the "saves as preset" option, data about the currently selected theater is stored so that on future screens that list locations, the theater will be one of the locations presented to the user. After selecting "save as preset", the user will receive a confirmation screen as follows:

| Save as Preset |
|---|
| "theater" saved as preset.<br>OK --> go to Theater Options |

If the user selects the All Showtimes option, the user is presented with the following All Showtimes screen:

| All Showtimes |
|---|
| All showtimes for "theater":<br>1. movie1 time time time<br>time time time time time<br>2. movie2 time time time<br>time time time time time<br>etc.<br>9. movie9 time time time |

-continued

| All Showtimes |
|---|
| time time time time time |
| More |
| Detail    Cancel --> go back to Theater Options/or |
| Select Theater for Browse by Theater |
| - Detail goes to Movie Match |

If the user selects the Browse by Type option, the user is presented with the following Browse by Type screen:

| Browse by Type |
|---|
| Select Type: |
| 1 Art |
| 2 Comedy |
| etc. |
| OK    Cancel --> go to Movie Guide |

When a particular type of movie is selected from the Browse by Type screen, the user is presented with a list of movies that have been categorized as movies of the selected type, as follows:

| Movie List |
|---|
| "type" movies: |
| 1 movie1 |
| 2 movie2 |
| etc. |
| OK    Cancel --> go to Select Type |
| - OK goes to Movie Match |

If the user selects the Browse by Theater option, the user is presented with the following Browse by Theater screen:

| Browse by Theater |
|---|
| (location flow) |

The (location flow) may include locations that are not themselves theaters. If one of those locations is selected, then a search is made of theaters associated with the selected location, and the user is presented with a screen as follows:

| Select Theater |
|---|
| Select Theater: |
| 1 Theater 1 |
| 2 Theater 2 |
| etc. |
| 9 Theater 9 |
| More |
| OK    Cancel --> go to Movie Guide |
| - OK goes to All Showtimes |

Hardware Overview

Figure 2:
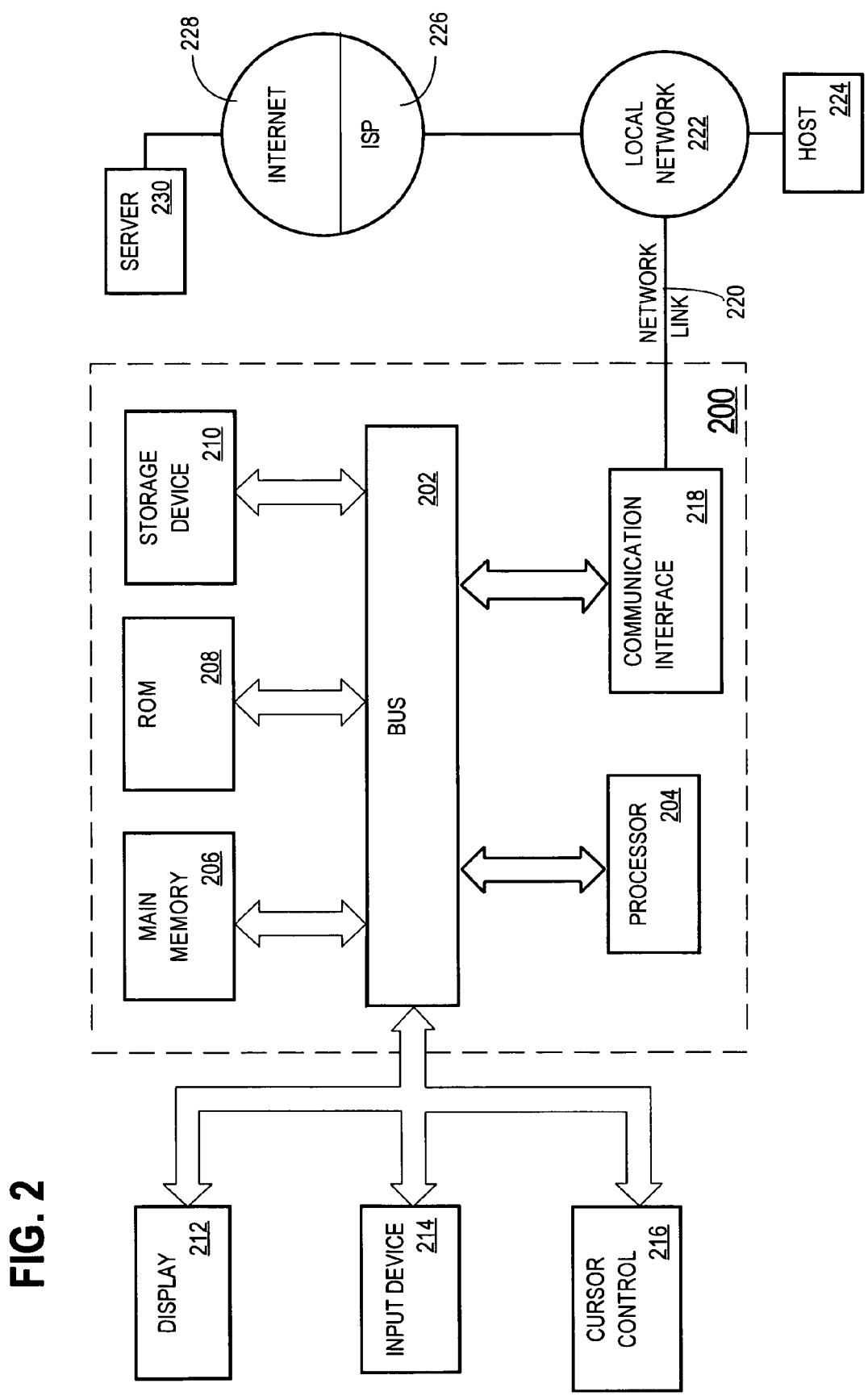
FIG. 2 is a block diagram of a computer system on which an embodiment of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are implemented by computer system 200 in response to processor 204 executing one or more sequences of one or more instructions contained in main memory 206. Such instructions may be read into main memory 206 from another computer-readable medium, such as storage device 210. Execution of the sequences of instruction contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application implements the techniques described herein.

The received code may be executed by processor 204 as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for sharing an opinion with an online community, the method comprising the steps of:

establishing a first connection between a mobile device and a gateway using a first protocol;
wherein said mobile device supports said first protocol but not a second protocol;
wherein said online community is associated with a server that supports said second protocol but not said first protocol;
receiving, from said mobile device at said gateway, opinion data indicating an opinion, that was specified through user interface controls on said mobile device, in a message that is not addressed to any specific member of the community, using said first protocol, wherein said user input was provided relative to a survey defined by a particular party;
transmitting said opinion data, using said second protocol, from said gateway to said server;
storing, at said server, for said survey, said opinion data as part of survey results, wherein said survey results reflect opinion data from a plurality of members of the online community; and
transmitting said survey results, using said second protocol, from said server to members of said online community in response to requests received by said server in said second protocol;
wherein the step of transmitting said survey results includes transmitting said survey results from said server to members of the online community that are not associated with said particular party that defined said survey;
wherein a second mobile device is a mobile device of a member of the community and not the particular party that defined the survey;
wherein said member provides user input, that indicates a second opinion, relative to a different survey, results of which other members of said online community may request and receive;
receiving a request for said survey results, using said first protocol, from said second mobile device at said gateway, wherein the request was specified in second user input through user interface controls on said second mobile device, wherein said second user input does not initiate the creation of said survey;
transmitting a request for said survey results, using said second protocol, from said gateway to said server;
in response to said request received at said server using said second protocol, transmitting said survey results, using said second protocol, to said gateway; and
sending said survey results, using said first protocol, from said gateway to said second mobile device.

2. The method of claim 1 wherein:
said first protocol is WAP; and
said second protocol is HTTP.

3. The method of claim 1 wherein:
the step of receiving opinion data from said mobile device at said gateway includes receiving said opinion data over a wireless connection; and
the step of transmitting said opinion data from said gateway to said server includes transmitting said opinion data over a network to which both said gateway and said server are connected.

4. The method of claim 1 further comprising the steps of:
prior to receiving user input that indicates said opinion, transmitting, to said mobile device, from said server, through said gateway, previous opinion data that indicates an opinion previously stored on said server;
wherein said user input is entered as a response to said previous opinion data; and said server storing an association between said previous opinion data and said opinion data.

5. The method claim 1 wherein:
the opinion data is stored within said mobile device; and
the stored opinion data is received from said mobile device at said gateway in a batch with other opinion data previously entered by a user of said mobile device.

6. The method of claim 1 wherein:
the step of receiving user input that indicates said opinion through user interface controls on said mobile device is performed while said mobile device does not have a connection to said gateway;
the opinion data is stored within said mobile device; and
the stored opinion data is received from said mobile device at said gateway after a connection is established between said mobile device and said gateway.

7. A computer-readable storage medium encoded with instructions for sharing an opinion with an online community, the instructions which, when executed by one or more processors, cause the one or more processors to perform the steps of:
establishing a first connection between a mobile device and a gateway using a first protocol;
wherein said mobile device supports said first protocol but not a second protocol;
wherein said online community is associated with a server that supports said second protocol but not said first protocol;
receiving, from said mobile device at said gateway, opinion data indicating an opinion, that was specified through user interface controls on said mobile device, in a message that is not addressed to any specific member of the community, using said first protocol, wherein said user input was provided relative to a survey defined by a particular party;
transmitting said opinion data, using said second protocol, from said gateway to said server;
storing, at said server, for said survey, said opinion data as part of survey results, wherein said survey results reflect opinion data from a plurality of members of the online community; and
transmitting said survey results, using said second protocol, from said server to members of said online community in response to requests received by said server in said second protocol;
wherein the step of transmitting said survey results includes transmitting said survey results from said server to members of the online community that are not associated with said particular party that defined said survey;
wherein a second mobile device is a mobile device of a member of the community and not the particular party that defined the survey;
wherein said member provides user input, that indicates a second opinion, relative to a different survey, results of which other members of said online community may request and receive;
receiving a request for said survey results, using said first protocol, from said second mobile device at said gateway, wherein the request was specified in second user input through user interface controls on said second mobile device, wherein said second user input does not initiate the creation of said survey;
transmitting a request for said survey results, using said second protocol, from said gateway to said server;
in response to said request received at said server using said second protocol, transmitting said survey results, using said second protocol, to said gateway; and
sending said survey results, using said first protocol, from said gateway to said second mobile device.

8. The computer-readable storage medium of claim 7 wherein:
said first protocol is WAP; and
said second protocol is HTTP.

9. The computer-readable storage medium of claim 7 wherein:
the step of receiving opinion data from said mobile device at said gateway includes receiving said opinion data over a wireless connection; and
the step of transmitting said opinion data from said gateway to said server includes transmitting said opinion data over a network to which both said gateway and said server are connected.

10. The computer-readable storage medium of claim 7, wherein the instructions which, when executed by the one or more processors, further cause the one or more processors to perform the steps of:
prior to receiving user input that indicates said opinion, transmitting, to said mobile device, from said server, through said gateway, previous opinion data that indicates an opinion previously stored on said server;
wherein said user input is entered as a response to said previous opinion data; and
said server storing an association between said previous opinion data and said opinion data.

11. The computer-readable storage medium of claim 7 wherein:
the opinion data is stored within said mobile device; and
the stored opinion data is received from said mobile device at said gateway in a batch with other opinion data previously entered by a user of said mobile device.

12. The computer-readable storage medium of claim 7 wherein:
the step of receiving user input that indicates said opinion through user interface controls on said mobile device is performed while said mobile device does not have a connection to said gateway;
the opinion data is stored within said mobile device; and
the stored opinion data is received from said mobile device at said gateway after a connection is established between said mobile device and said gateway.

* * * * *

UNITED STATES PATENT AND TRADEMARK OFFICE
CERTIFICATE OF CORRECTION

| | |
|---|---|
| PATENT NO. | : 7,310,350 B1 |
| APPLICATION NO. | : 09/751259 |
| DATED | : December 18, 2007 |
| INVENTOR(S) | : Shao et al. |

It is certified that error appears in the above-identified patent and that said Letters Patent is hereby corrected as shown below:

On the title page, item (56), under "Other Publications", in column 2, line 1, delete "retreived" and insert -- retrieved --, therefor.

On page 2, under "Other Publications", in column 2, line 1, delete "Retreived" and insert -- Retrieved --, therefor.

On page 2, under "Other Publications", in column 2, line 18, delete "Intellectural" and insert -- Intellectual --, therefor.

In column 7, line 2, delete "user's" and insert -- users --, therefor.

In column 8, line 56, delete "OK" and insert --  OK --, therefor.

In column 8, line 61, delete "poor." and insert -- poor.. --, therefor.

In column 9, line 12, delete "options" and insert -- option --, therefor.

In column 11, line 26, delete "move" and insert -- movie --, therefor.

In column 14, line 4, delete "P.2" and insert -- p.2 --, therefor.

In column 15, line 3, after "screen" insert -- . --.

In column 17, line 38, delete "blah|" and insert -- blah | --, therefor.

In column 18, line 42, delete "saves" and insert -- save --, therefor.

UNITED STATES PATENT AND TRADEMARK OFFICE
CERTIFICATE OF CORRECTION

PATENT NO. : 7,310,350 B1
APPLICATION NO. : 09/751259
DATED : December 18, 2007
INVENTOR(S) : Shao et al.

It is certified that error appears in the above-identified patent and that said Letters Patent is hereby corrected as shown below:

In column 20, line 37, delete "instruction" and insert -- instructions --, therefor.

In column 23, line 3, in Claim 5, after "method" insert -- of --.

Signed and Sealed this

Second Day of September, 2008

JON W. DUDAS
*Director of the United States Patent and Trademark Office*